US006819298B2

(12) United States Patent
Jung

(10) Patent No.: US 6,819,298 B2
(45) Date of Patent: Nov. 16, 2004

(54) HIGH-POWER MICROWAVE ANTENNA SYSTEM

(75) Inventor: Markus Jung, Eicklingen (DE)

(73) Assignee: Rheinmetall W & M GmbH, Unterlüss (DE)

( * ) Notice: Subject to any disclaimer, the term of this patent is extended or adjusted under 35 U.S.C. 154(b) by 370 days.

(21) Appl. No.: 09/987,233

(22) Filed: Nov. 8, 2001

(65) Prior Publication Data

US 2002/0089463 A1 Jul. 11, 2002

Related U.S. Application Data

(63) Continuation of application No. 09/883,510, filed on Jun. 15, 2001, now abandoned.

(30) Foreign Application Priority Data

Jun. 15, 2000 (DE) ........................................ 100 29 263

(51) Int. Cl.[7] ................................................ B60R 21/32
(52) U.S. Cl. ....................................... 343/782; 280/735
(58) Field of Search ................................ 343/782, 872, 343/754; 280/735, 732; 307/10.1, 121

(56) References Cited

U.S. PATENT DOCUMENTS 2,977,596 A 3/1961 Justice ....................... 343/872
3,321,763 A 5/1967 Ikrath et al. ................ 343/754
6,273,461 B1 * 8/2001 Kaiker et al. ............... 280/735
RE37,736 E * 6/2002 Breed et al. ................ 280/735
6,559,555 B1 * 5/2003 Saitou et al. ............. 307/10.1

FOREIGN PATENT DOCUMENTS

WO WO 90/01813 2/1990

OTHER PUBLICATIONS

Kuniharu, "Baloon Parabolic Antenna", Patent Abstracts of Japan, vol. 010, No. 272 (E–437), Sep. 16, 1986, JP 61–093706.

* cited by examiner

*Primary Examiner*—James Clinger
(74) *Attorney, Agent, or Firm*—Venable LLP; Stuart I. Smith

(57) ABSTRACT

A high-power microwave antenna in which, in order to radiate a pulse (8), the antennas (4) of the high power microwave are actuated by a pulse-generating source (3) and are embodied normally as wire antennas, horn antennas or the like. In particular for HPM active systems (1) to be conveyed, the antenna aperture of the antenna (4) is limited by the geometric edge dimensions of a carrier system (2) for the HPM active system (1), which further leads to a reduction in the efficiency of the antenna (4). According to the present invention, the antenna (4) is integrated into an airbag (5) that is inflated for operational use and thereby simulate the antenna (4). The antenna airbag (5) is inflated near a target (100) onto which at least one pulse (8) must be radiated.

14 Claims, 4 Drawing Sheets

Fig.3
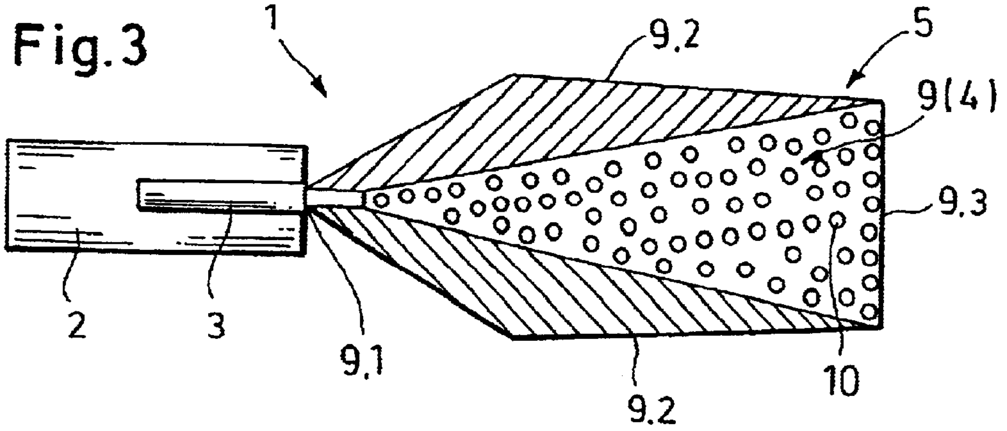
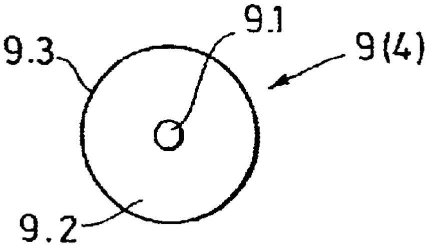
Fig.3a
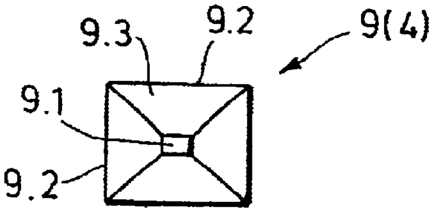
Fig.3b
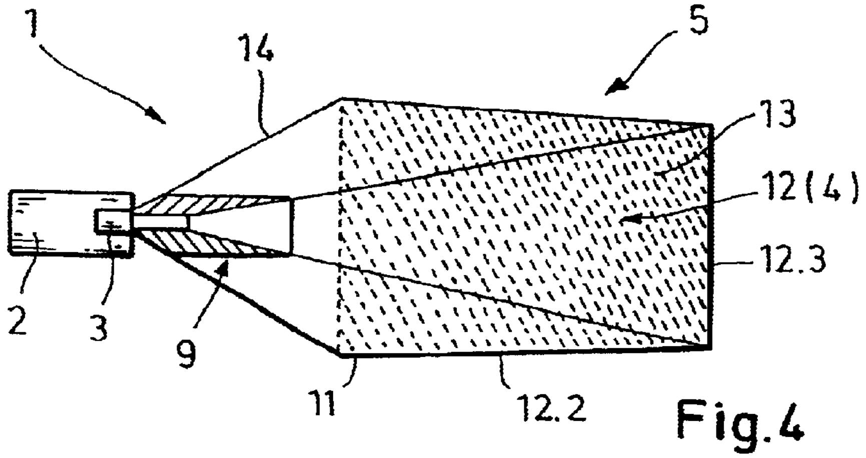
Fig.4

HIGH-POWER MICROWAVE ANTENNA SYSTEM

CROSS REFERENCE TO RELATED APPLICATION

This application is a continuation of U.S. patent application Ser. No. 09/883,510, filed Jun. 15, 2001 now abandoned.

This application claims the priority of German Patent Application No. 100 29 263.1 filed Jun. 15, 2000, which is incorporated herein by reference.

BACKGROUND OF THE INVENTION

The invention relates to an antenna system, in particular a high-power microwave antenna with a pulse generating source for generating a pulse to be radiated toward a target.

For the realization of indirectly conveyed HPM (high-power microwave) active systems, antennas or antenna systems requiring little structural space must be provided to meet the carrier system requirements. In addition, these should also meet the HPM source requirements with respect to voltage-sustaining capacity, surface quality, antenna gain, directional efficiency, etc.

U.S. Pat. No. 5,671,133 discloses a HPM source, for example, for a HPM active system.

A HPM active system that is conveyed is described in U.S. Pat. No. 5,192,827. For the non-lethal destruction of a target, meaning destruction of only the electronic components of the target, this HPM active system is provided with a projectile as carrier system. A TEM (transverse electromagnetic) horn antenna, an arrangement of dipoles, or a helical antenna (wire) with angular accuracy, is proposed for the microwave antenna. The antenna gain and directional efficiency are very low and non-homogeneous, particularly for wire-type antennas. The field intensity that can be radiated is determined by the environmental conditions of the HPM active system. The maximum field intensity that can be radiated with horn antennas is restricted by the horn antenna aperture size that is subject to the geometric edge parameters of the carrier system.

The configuration of a horn antenna used as a ground station antenna for satellite radio is described in European published Application Patent Application No. EP 0 128 970 A1. Another type of horn antenna is known from U.S. Pat. No. 5,568,160 and a cylindrical hybrid horn antenna is described in U.S. Pat. No. 4,783,665. The principle of a multi-horn antenna follows from the U.S. Pat. Nos. 5,113,197 as well as 4,758,842.

The aforementioned microwave antennas are not suitable for use especially in conveyable HPM active systems because the structural space for installing these types of antennas does not exist in the carrier system.

SUMMARY OF THE INVENTION

Thus, it is the object of the invention to provide an antenna that requires little structural space and additionally permits the radiation of short HPM pulses.

This object generally is achieved according to the present invention by an antenna system, in particular a high-power microwave antenna system, comprising a pulse-generating source for generating a pulse to be radiated by the antenna toward a target; an antenna formed by a conductive inner surface of an antenna airbag that is electrically connected to the pulse-generating source; and a gas generator for filling the antennas airbag with a gas to inflate the airbag and render it operative for radiating the pulse from the source.

The invention is based on the idea of creating an antenna by using an airbag that inflates near the target, so that HPM pulses, created by an HPM source, can subsequently be radiated onto the target. By integrating the antenna into a conveying carrier system, it is possible to use an airbag that already exists in the carrier system or to install an additional airbag in the carrier system. An existing airbag of this type is described in German published Patent Application No. 34 32 614 A1, which is designed to unfold the vanes of a projectile (carrier system) for the operating position.

Further advantageous embodiments are disclosed and described.

Thus, the airbag (antenna airbag) can be a horn antenna, a reflector or a Cassegrain-type reflector antenna and can simulate these either in part or completely.

The Cassegrain-type reflector antenna in this case preferably can comprise a horn antenna as feeding system and a curved reflecting surface on the rear antenna airbag or a combination antenna airbag and parachute. For a modification, a horn-shaped airbag is integrated into the Cassegrain-type reflector antenna, which in turn functions as the feeding system. This measure increases the antenna aperture, thus making it possible to increase the maximum achievable field intensity at the feeding location as well as increase the antenna gain or the directional characteristic.

The antenna airbag is filled either completely or partially with electronegative gas to further increase the maximum power that can be radiated and thus the maximum achievable field intensity.

In order to improve the radiation property of the antenna, the transmitting or antenna aperture can be improved or enlarged by individually designing the antenna airbag. Thus, the reflector curvature can be adjusted ideally by tailoring the airbag.

This type of solution offers a space-saving antenna, which does not influence the requirements that must be met by the carrier system (artillery shell, rocket, drone, projectile, etc.) with respect to volume, weight, acceleration stability, flow characteristics, etc., particularly if installed in a carrier system to be conveyed, but which nevertheless ensures a secure radiation of short HPM pulses.

The invention is explained in further detail with exemplary embodiments and drawings.

BRIEF DESCRIPTION OF THE DRAWINGS

FIG. 3 shows a first embodiment of an antenna airbag according to the invention, embodied as a horn antenna.

FIG. 3*a* is an end view of the horn antenna shown in FIG. 3, which is in the shape of a truncated cone.

FIG. 3*b* is an end view of the horn antenna shown in FIG. 3, which is in the shape of a truncated pyramid.

FIG. 4 shows another embodiment of the antenna airbag according to the invention, designed as a Cassegrain-type reflector antenna with the airbag horn antenna shown in FIG. 3 and a parachute reflector.

DETAILED DESCRIPTION OF THE PREFERRED EMBODIMENTS

Figure 1:
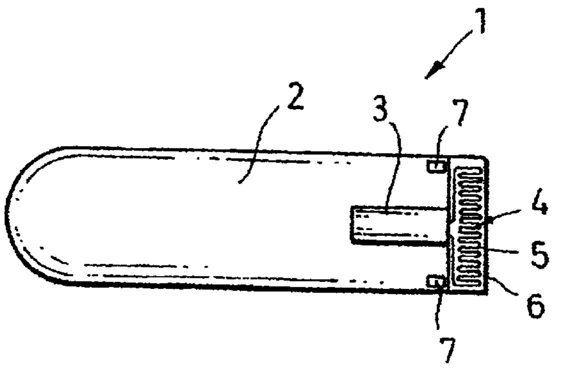
FIG. 1 shows a basic carrier system with a integrated HPM source and non-inflated antenna airbag.

FIG. 1 shows a HPM active system 1 to be conveyed, consisting of a carrier system 2, e.g., a prospective pulse-generating source 3, as well as an antenna 4. The antenna 4 is a folded antenna airbag 5 in the HPM active system 1, which antenna is stored in or on the carrier system 2, for example, inside an aerodynamically advantageous casing 6 at the rear of the carrier system 2. The antenna airbag 5 is connected to at least one gas generator 7 disposed in the carrier system 2. The antenna 4 is electrically connected on one side to the pulse-generating source 3. The pulse-generating source 3, for example, a HPM source, provides the short pulses 8 that must be transmitted to the antenna 4 and can be in the picosecond range (ps), preferably ranging from 10 picoseconds (ps) up to 10 microseconds (μs). The antenna 4 is designed as a broadband antenna and supplies frequencies ranging from 10 MHz up to 10 GHz. Additional modules and units of the HPM active system 1 are not shown or mentioned here for reasons of clarity.

Figure 2:
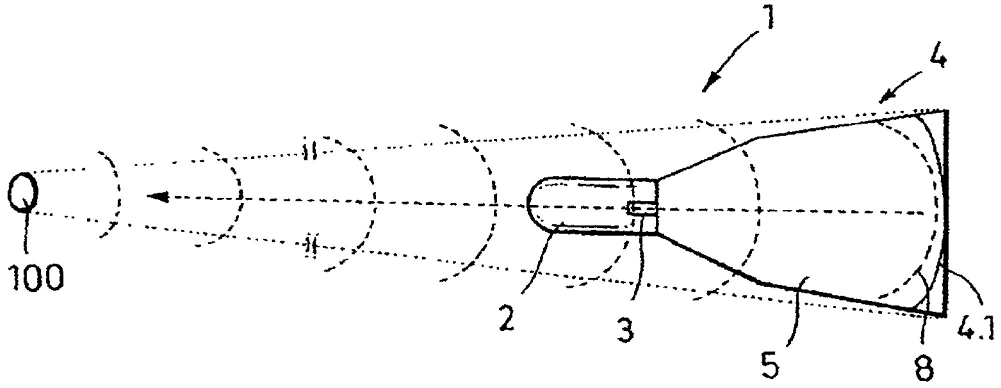
FIG. 2 is a basic schematic representation of the operating mode of a HPM active system during the operational use of the antenna airbag.

FIG. 2 shows the general principle of the cooperation between the antenna 4 and the antenna airbag 5 during operational use. During the approach or the approach phase of the HPM active system 1 to a target 100, the antenna 4 is inflated for operational use with gas 10 (FIG. 3) from the at least one gas generator 7, but only a few milliseconds (ms) before radiating the at least one pulse 8 into the antenna airbag 5. In the process, the casing 6 is destroyed. Once the antenna airbag 5 is inflated to a point that is favorable for radiation, the at least one short pulse 8 is radiated by reflection via a type of paraboloid 4.1 of antenna 4 in the antenna airbag 5 in the direction toward target 100, as indicated by the arrow. Following radiation of the pulse 8, the antenna 4 and thus also the antenna airbag 5 can be ejected, provided the airbag 5 has no other functions within the HPM active system 1, e.g., for stabilizing the flight of the HPM active system 1.

The target 100 can be a target 100 that is located in the air or on the ground. For the latter, the HPM active system 1 is preferably positioned perpendicular and above the target 100.

With the antenna airbag 5 according to the invention, different antenna arrangements can be copied as a result of multiple design options for the airbag.

The following figures show some of these design options.

For the exemplary embodiment according to FIG. 3, the antenna airbag 5 simulates a horn antenna 9 in the shape of a truncated pyramid (FIG. 3*b*) or truncated cone (FIG. 3*a*), wherein the horn antenna 9 expands from the smaller truncated pyramid or cone area 9.1 toward the larger area 9.3. The larger truncated cone or pyramid area or base 9.3 can be called the bottom surface of the truncated cone or pyramid and thus the horn antenna aperture. The size of this surface 9.3 determines the radiation property of the horn antenna 9. The sides 9.2 of the airbag 5 and thus of the horn antenna 9 are designed as metallically conducting flexible walls, e.g., a metallic coating disposed on the non-conductive material of the airbag 5, whereas the bottom surface 9.1 of the truncated cone or pyramid surface 9.3 does not contain a coating and is therefore open, at least electrically. On the truncated cone or pyramid surface 9.1, the horn antenna 9 is electrically connected to the pulse-generating source 3. The antenna airbag 5 is preferably filled with an electronegative gas 10, for example $N_2$, $SF_6$. As a result of this, the field intensity increases during the operational use of the antenna airbag 5 as antenna 4, which in turn positively influences the antenna efficiency.

The horn antenna 9 shown in FIGS. 3*a*, 3*b* is shown as an end view of the truncated surface 9.3, wherein the round or angular shape of the horn antenna 9 is clearly visible.

In the exemplary embodiment according to FIG. 4, the antenna airbag 5 comprises a combination arrangement, consisting of a horn antenna 9 according to FIG. 3 and a separate or additional airbag 11 designed as a parachute, which on one side is connected to and jointly operates with the horn antenna 9. Owing to this combination, a Cassegrain-type reflector antenna 12 is created, which has a slightly curved bottom surface 12.3 that is enlarged relative to the bottom surface 9.3 of horn antenna 9. This type of antenna aperture thus noticeably improves the radiation properties of antenna 4 during the operational use. The horn antenna 9 in this case functions as a supply system for the antenna 4, meaning for the Cassegrain-type reflector antenna 12.

The parachute-type airbag 11 is provided with a metal reflector 13 on the lateral sides 12.2, meaning around the periphery. The peripheral connecting surface 14 between airbag 11 and horn antenna 9 is metallically non-conducting, and thus transmissive of a pulse reflected by the reflector 13.

Figure 5:
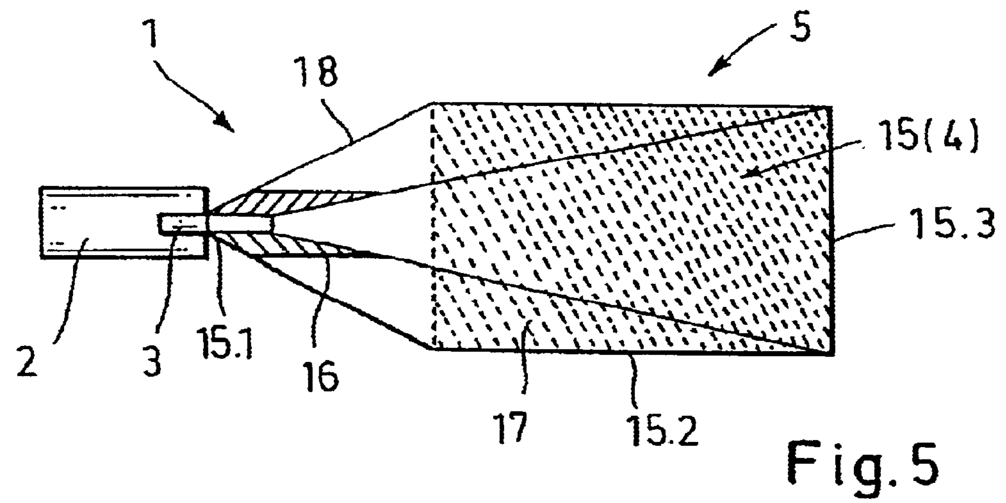
FIG. 5 shows a further embodiment of the antenna airbag, designed as a Cassegrain-type reflector antenna with an integrated, horn-like supply.

FIG. 5 shows another exemplary embodiment of a Cassegrain-type reflector antenna 15. In contrast to the reflector antenna 12 according to FIG. 4, a horn-type antenna 16 is integrated, as a supply system, into a common airbag of a Cassegrain-type reflector antenna 15. That is, the horn antenna 16 is not found in a separate airbag. The slightly curved metallic reflector 17 in this case is not a component of a parachute-type airbag, but a component of the antenna airbag 5 that forms the Cassegrain-type reflector antenna 15. The connecting surfaces 18 between the reflector portion 17 of the airbag and the portion of the airbag forming the horn antenna, extend around the periphery and are metallically non-conducting and transmissive of a pulse reflected from reflector portion 17.

Figure 5A:
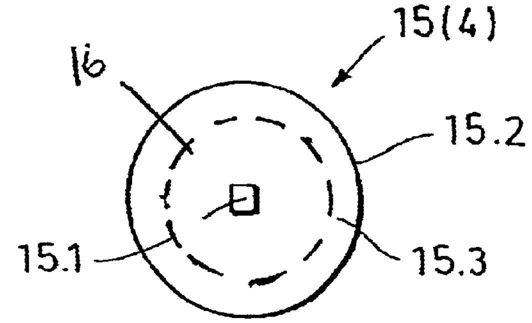
FIG. 5*a* is an end view of the reflector shown in FIG. 5, which is in the shape of a truncated cone.
Figure 5B:
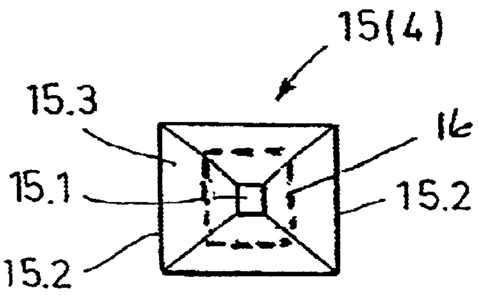
FIG. 5*b* is an end view of the reflector antenna shown in FIG. 5, which is in the shape of a truncated pyramid.
Figure 6:
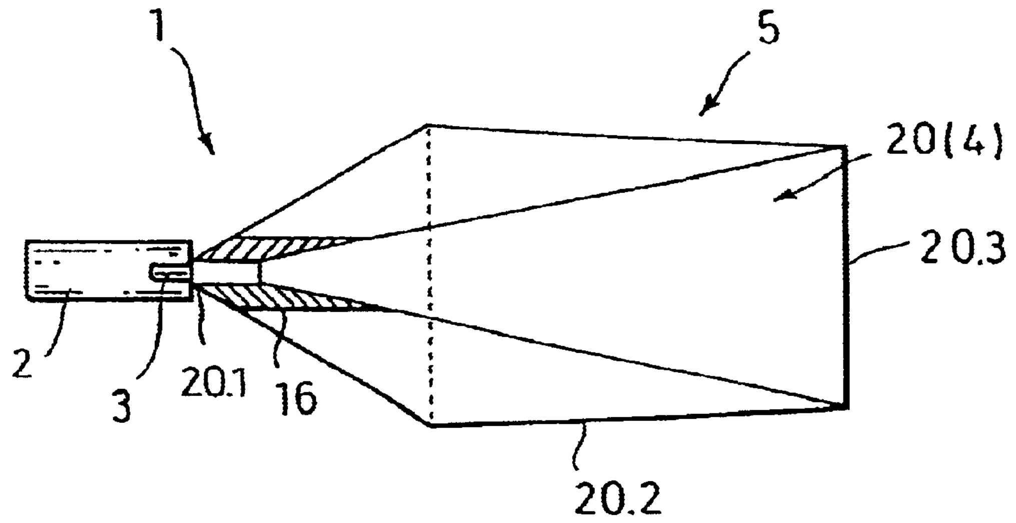
FIG. 6 shows a modification of the antenna airbag of FIG. 1 and FIG. 5.

The embodiments in FIGS. 5*a* and 5*b* show an end view of the Cassegrain-type reflector antennas 12, 15, while FIG. 6 contains another embodiment. The Cassegrain-type reflector antenna 12, 15, 20 for this case can also have a truncated cone or pyramid shape.

In the exemplary embodiment according to FIG. 6, the reflector antenna 15 does not contain a reflector around the periphery. Rather, the sides 20.2 of this exemplary embodiment are designed to be metallically non-conducting. In that case, the bottom surface 20.3 of the antenna 4 operating as a reflector antenna 20 is metal-coated and functions as the reflector.

Figure 7A:
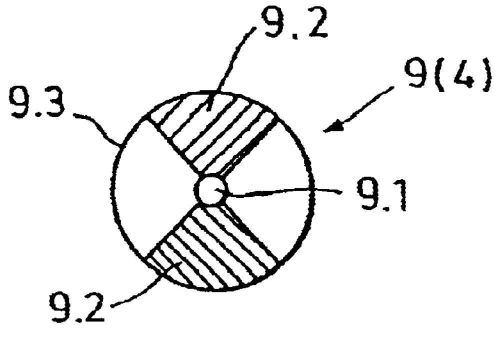
FIG. 7 is an end view of the horn antenna according to FIG. 3 which is in the shape of a truncated cone and has only partially conductive sides.
FIG. 7*b* is an end view of the horn antenna according to FIG. 3 which is in the shape of a truncated pyramid and has only partially conductive sides.
Figure 7B:
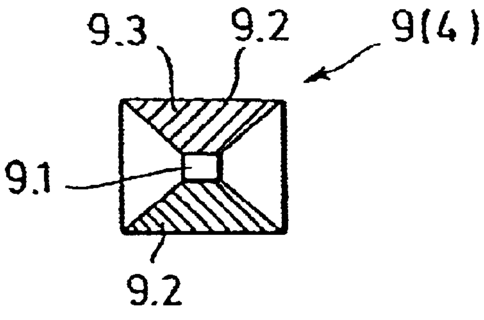

For the exemplary embodiments, the short pulses 8 are reflected in the transmitting direction shown in FIG. 2, wherein this reflection occurs at the side reflectors 9.2, 12.2 or 15.2 or the coated bottom surface 20.3. It is understood that the antenna airbag 5 can also contain combinations of both reflection options. It is not necessary for the entire lateral sides 9.2, 12.2 or 15.2 of antenna 4 to have a metallically conducting design. Rather, the conductive sides can occur in pairs or also other structures, e.g., as shown in FIGS. 7*a* and 7*b*, so that a TEM horn antenna is simulated among other things.

It must also be mentioned here that the filling gas for all antenna airbags 5 can be the previously listed electronegative gas 10. Furthermore, the proposed solution is not only limited to the exemplary embodiments shown herein. For example, the horn antenna 9 can also be configured as a multi-horn antenna, wherein the structure of the angular pyramids, for example, forms only during the configuration of the antenna airbag.

An antenna airbag 5 of the type proposed herein can also be used for stationary HPM active systems or similar ground-based systems. The antenna airbag 5 for the antenna 4 in that case is also formed only just prior to sending out the pulse 8 toward the target 100 that is located next to the antenna 4.

The invention now being fully described, it will be apparent to one of ordinary skill in the art that many changes and modifications can be made thereto without departing from the spirit or scope of the invention as set forth herein.

What is claimed is:

1. A high-power microwave antenna system comprising:

a pulse-generating source for generating a pulse to be radiated by the antenna toward a target; an antenna formed by an electrically conductive inner surface of an antenna airbag that is electrically connected to the pulse-generating source; and a gas generator for filling the antenna airbag with gas to inflate the airbag and render it operational for radiating the pulse from the source.

2. An antenna system according to claim 1,wherein the conductive inner surface of the antenna airbag simulates a horn antenna.

3. An antenna according to claim 2, wherein at least part of the lateral inner surface of the antenna airbag is conductive and an end surface opposite the surface is non-conductive.

4. An antenna system according to claim 3, further comprising an additional parachute type airbag connected to said antenna airbag and provided with a conductive inner surface over at least part of its inner surface to form a reflector antenna with said horn antenna serving as a feed for the reflector.

5. An antenna according to claim 1, wherein the conductive inner surface of the antenna airbag forms a reflector of a reflector antenna for a pulse generated by the source.

6. An antenna according to claim 3, wherein at least a portion of the inner surface of the airbag adjacent to source is conductive and form a horn antenna, and a further portion of the inner surface of the airbag axially displaced from the horn antenna is electrically conductive and forms a reflector for a pulse radiated by the horn antenna, whereby a reflector antenna is formed within the airbag.

7. An antenna system according to claim 6, wherein the further portion includes a lateral surface of the airbag.

8. An antenna system according to claim 6, wherein the further surface is a curved surface disposed opposite the horn antenna aperture.

9. An antenna according to claim 1, wherein an electronegative gas is used as the filling gas for the antenna airbag.

10. An antenna system according to claims 1, wherein the antenna airbag has a shape of one of a truncated cone and truncated pyramid once it is filled with the filling gas.

11. An antenna system according to claim 1, wherein a high power microwave (HPM) source is used as the pulse-generating source.

12. An antenna system according to claim 1, wherein the antenna is a broadband antenna.

13. An antenna system according to claim 1, wherein the antenna airbag that forms the antenna is mounted in the non-inflated state inside an aerodynamic casing on a carrier system of a high power microwave (HPM) active system to be conveyed.

14. An antenna system according to claim 1, wherein the antenna airbag that forms the antenna is mounted on a carrier system for a stationary high power microwave (HPM) active system while in the non-inflated state.

* * * * *